US007436639B2

(12) United States Patent
Power et al.

(10) Patent No.: US 7,436,639 B2
(45) Date of Patent: Oct. 14, 2008

(54) COMPACT GROUND FAULT CIRCUIT INTERRUPTER MODULE

(76) Inventors: John J. Power, 923 Brushhollow Rd., Westbury, NY (US) 11590; Armando Calixto, 79-14 261st St., Floral Park, NY (US) 11004; Roger M. Bradley, 2071 Decatur Ave., North Bellmore, NY (US) 11710

( * ) Notice: Subject to any disclaimer, the term of this patent is extended or adjusted under 35 U.S.C. 154(b) by 408 days.

(21) Appl. No.: 11/079,342

(22) Filed: Mar. 15, 2005

(65) Prior Publication Data

US 2005/0231861 A1 Oct. 20, 2005

Related U.S. Application Data

(60) Provisional application No. 60/556,271, filed on Mar. 25, 2004.

(51) Int. Cl.
*H02H 3/00* (2006.01)

(52) U.S. Cl. ......................... 361/42; 361/115; 361/730; 361/736; 361/753; 335/18

(58) Field of Classification Search ............. 361/42–50, 361/115, 730, 736, 753; 335/18
See application file for complete search history.

(56) References Cited

U.S. PATENT DOCUMENTS

| | | | | |
|---|---|---|---|---|
| 3,130,283 | A * | 4/1964 | Brenneman et al. | 335/125 |
| 4,567,544 | A * | 1/1986 | Ronemus et al. | 361/753 |
| 4,739,450 | A * | 4/1988 | Misencik | 361/733 |
| 4,771,367 | A * | 9/1988 | Serr et al. | 361/730 |
| 5,459,444 | A * | 10/1995 | Baer et al. | 335/18 |
| 5,661,623 | A * | 8/1997 | McDonald et al. | 361/42 |
| 5,872,499 | A * | 2/1999 | Poulsen | 335/177 |
| 5,943,199 | A * | 8/1999 | Aromin | 361/42 |
| 6,469,881 | B2 * | 10/2002 | Gershen et al. | 361/42 |

* cited by examiner

*Primary Examiner*—Michael J Sherry
*Assistant Examiner*—Terrence R Willoughby
(74) *Attorney, Agent, or Firm*—Carter, DeLuca, Farrell & Schmidt, LLP

(57) ABSTRACT

A compact module with a pair of transformers and a double pole single throw relay (DPST) mounted onto a housing to create a self contained assembly for installation in a ground fault circuit interrupter (GFCI) as a unit. The first transformer has a core and is electrically coupled to a first set of terminals for connection to a printed circuit board (PCB). The second transformer is located adjacent to and magnetically coupled to the core of the first transformer and is electrically coupled to a second set of terminals for connection to the PCB. The DPST relay has a pair of stationary contacts and a pair of movable contacts for selectively connecting line phase and neutral conductive paths to a load.

44 Claims, 5 Drawing Sheets

COMPACT GROUND FAULT CIRCUIT INTERRUPTER MODULE

This application claims the benefit of the filing date of a provisional application having Ser. No. 60/556,271 which was filed on Mar. 25, 2004.

BACKGROUND OF THE INVENTION

1. Field of the Invention

The present invention pertains generally to ground fault circuit interrupters (GFCIs).

2. Description of the Related Art

GFCIs are well known electrical devices in common use today. They are often used to help protect against electrical shock due to ground fault conditions. A GFCI is basically a differential current detector operative to trip a contact mechanism when a certain amount of unbalanced current is detected between the phase wire and the neutral wire of an alternating current (AC) electrical power line. A typical GFCI includes electrical components such as transformers, a relay and circuitry for detecting a ground fault condition which make it difficult to incorporate into various GFCI configurations. It would be desirable to have a compact GFCI module capable of being incorporated within various GFCI configurations.

SUMMARY OF THE INVENTION

The present invention overcomes some of the deficiencies of the prior art by providing a compact module that can be incorporated with various ground fault circuit interrupter (GFCI) configurations such as angled plugs, in-line plugs, panel mounts, or other configurations.

In one aspect of the present invention, a compact module is provided that includes a pair of transformers and a double pole single throw (DPST) relay mounted in a housing to create a self contained assembly of components for installation in a GFCI as a unit. The first transformer having a toroidal core is electrically coupled to a first set of terminals for connection to a printed circuit board (PCB). The second transformer having a toroidal core is located adjacent to and magnetically coupled to the core of the first transformer and electrically coupled to a second set of terminals for connection to the PCB. The DPST relay has a pair of stationary contacts and a pair of movable contacts for selectively connecting phase and neutral conductive paths to a load.

In one embodiment, the module can be a self-contained GFCI assembly for use in an angled electrical plug. The first transformer can be positioned over the second transformer forming a stacked arrangement. One of the transformers can be a differential transformer for detecting an unbalanced current flowing through a line side phase and neutral conductor, and the other transformer can be a neutral transformer for detecting a low impedance condition between a load side neutral and ground conductor. The stationary contacts and movable contacts, which can be supported by respective contact arm members, are in electrical contact when the relay is energized. The relay can include a relay frame that supports a bobbin wound with a coil of wire and a rod shaped metal core that passes through the center of the bobbin to secure it to the frame. A spring can be used to provide an upward bias to an armature plate that hinges on a top portion of the relay frame. A first end of the spring can be attached to a portion of the armature plate and a second end of the spring can attached to the relay frame. A clamp can be used for securing the movable contact arms to the armature plate.

In a second aspect of the present invention, an electrical plug is provided that includes a housing for supporting a compact module and a PCB that includes a GFCI circuit detecting ground fault conditions. The compact module includes a pair of adjacent transformers each having a core and respective terminals for connection to the GFCI circuit, and a DPST relay having a pair of stationary contacts and a pair of movable contacts for selectively connecting line side conductors with load side conductors.

The compact module of the present invention may have one or more of the following advantages. The module helps make it possible to incorporate GFCI circuitry in various configurations such as an angled electrical plug, in-line plug, panel mount and other configurations.

The above stated and other embodiments and advantages of the invention will become more apparent from the following detailed description when taken with the accompanying drawings. It will be understood, however, that the drawings are for the purposes of illustration and are not to be construed as defining the scope or limits of the invention, references being had for the latter purpose to the claims appended hereto.

BRIEF DESCRIPTION OF THE DRAWINGS

Preferred embodiments of the present application are described herein with reference to the drawings in which similar elements are given similar reference characters, wherein.

DETAILED DESCRIPTION OF THE INVENTION

A compact module is described that is capable of being incorporated within various ground fault circuit interrupter (GFCI) configurations such as angled plugs, in-line plugs, panel-mounts, and other configurations. The module employs a double pole single throw (DPST) relay mechanism, a differential transformer and a neutral transformer which, when connected to a printed circuit (PC) board, can fit within a portable device such as an angled plug. The complete package is substantially equal in size to a comparable commercial relay.

Referring to FIGS. 1 through 4, there is shown a compact module 10 having a plastic housing 20 for supporting a relay portion and a transformer portion for use in various GFCI configurations.

Figure 1:
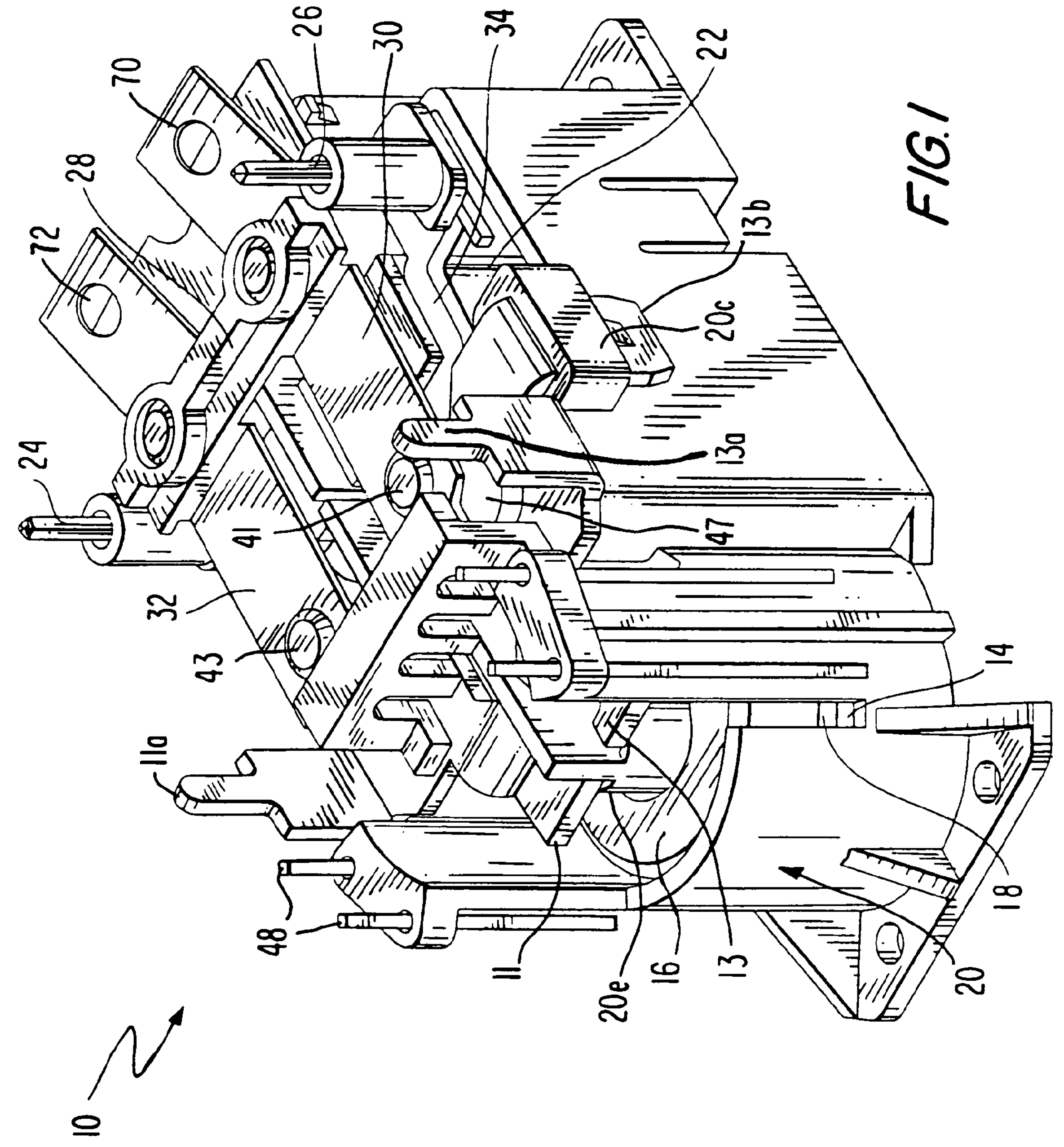
FIG. 1 is a perspective view of an embodiment of a compact module for a GFCI according to the present invention.
Figure 2:
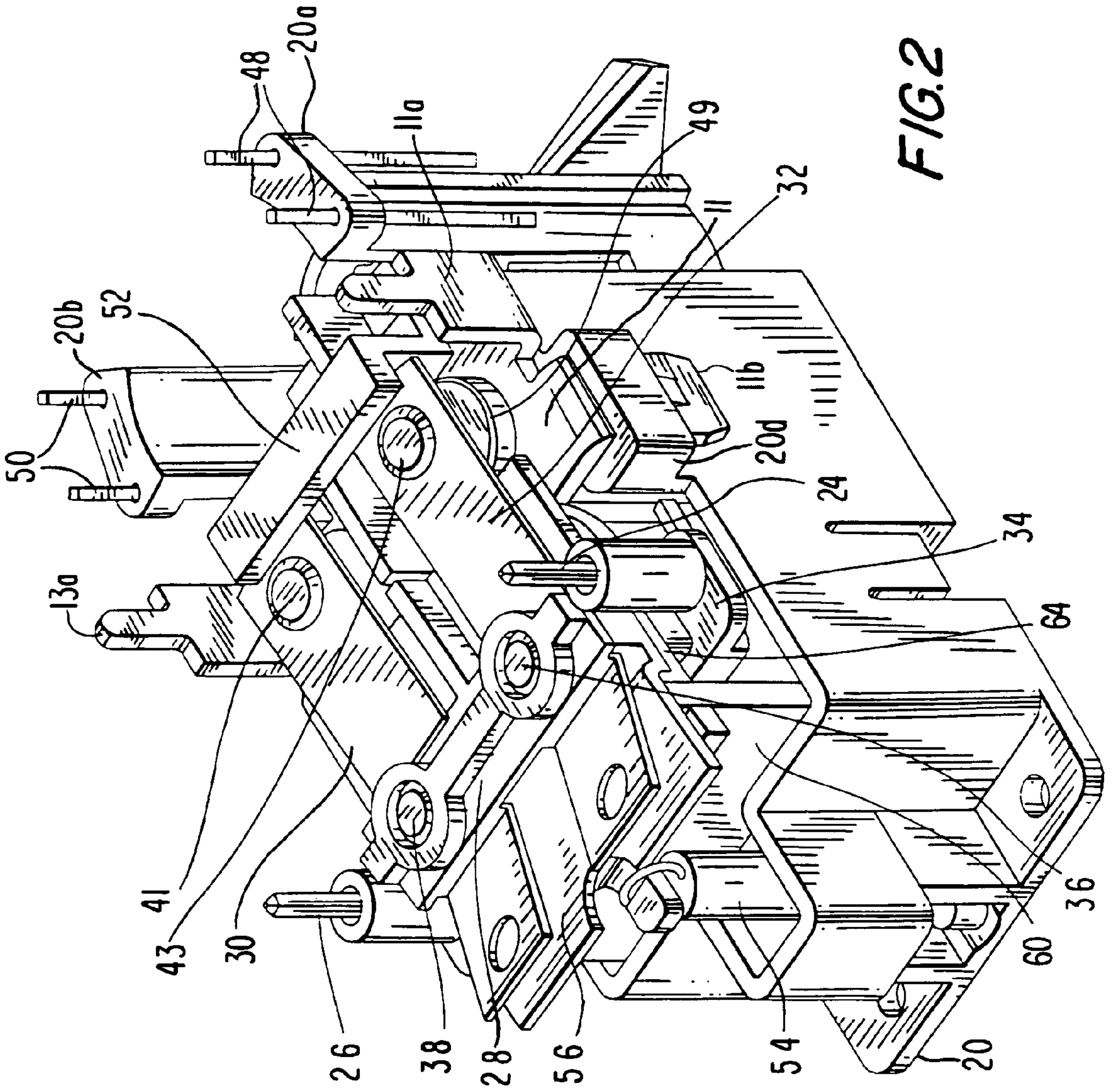
FIG. 2 is another perspective view of the module for the GFCI rotated 180 degrees from the view of FIG. 1.
Figure 3:
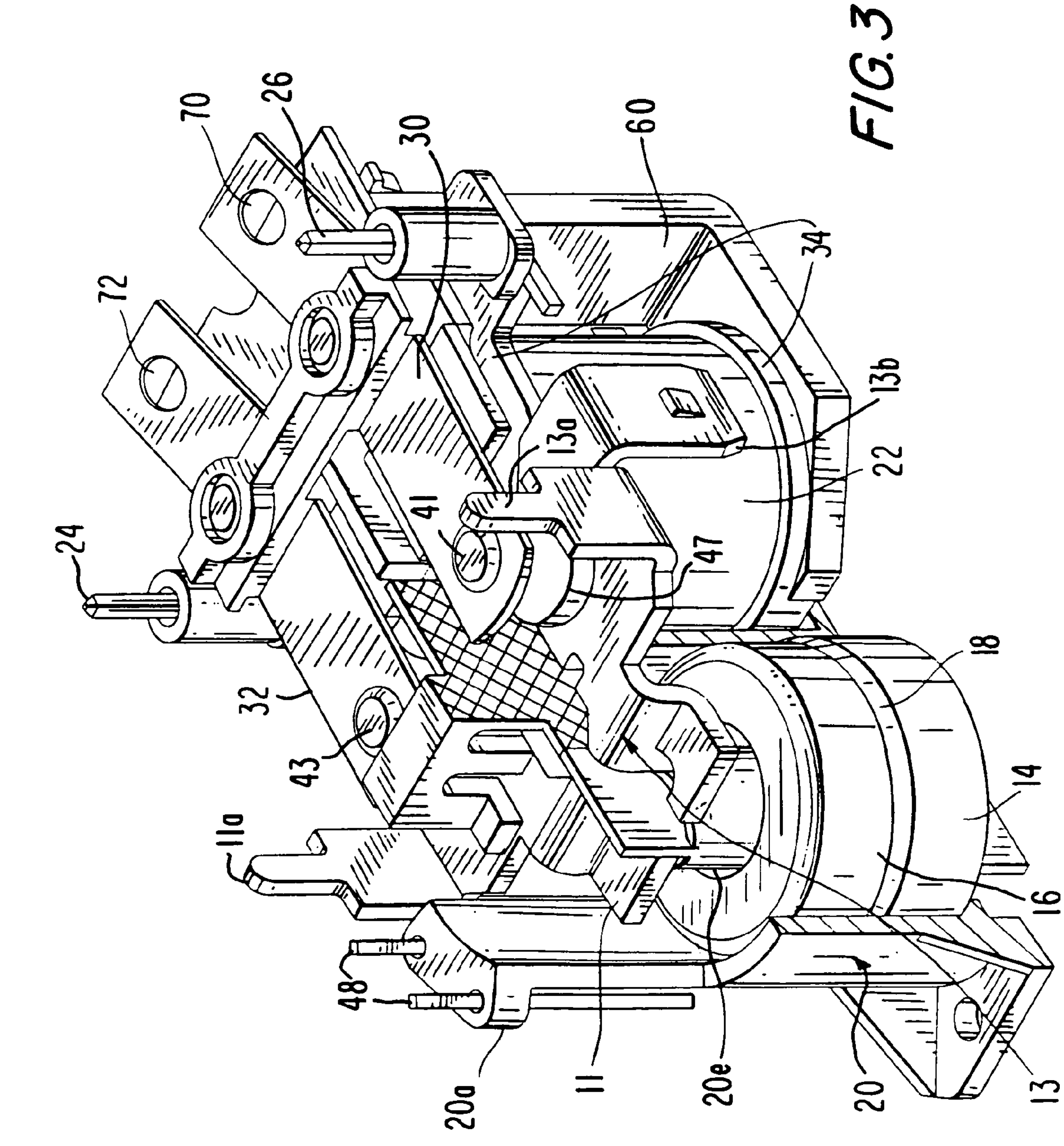
FIG. 3 is another perspective view of FIG. 1 sectioned to show the internal structure of the module.
Figure 4:
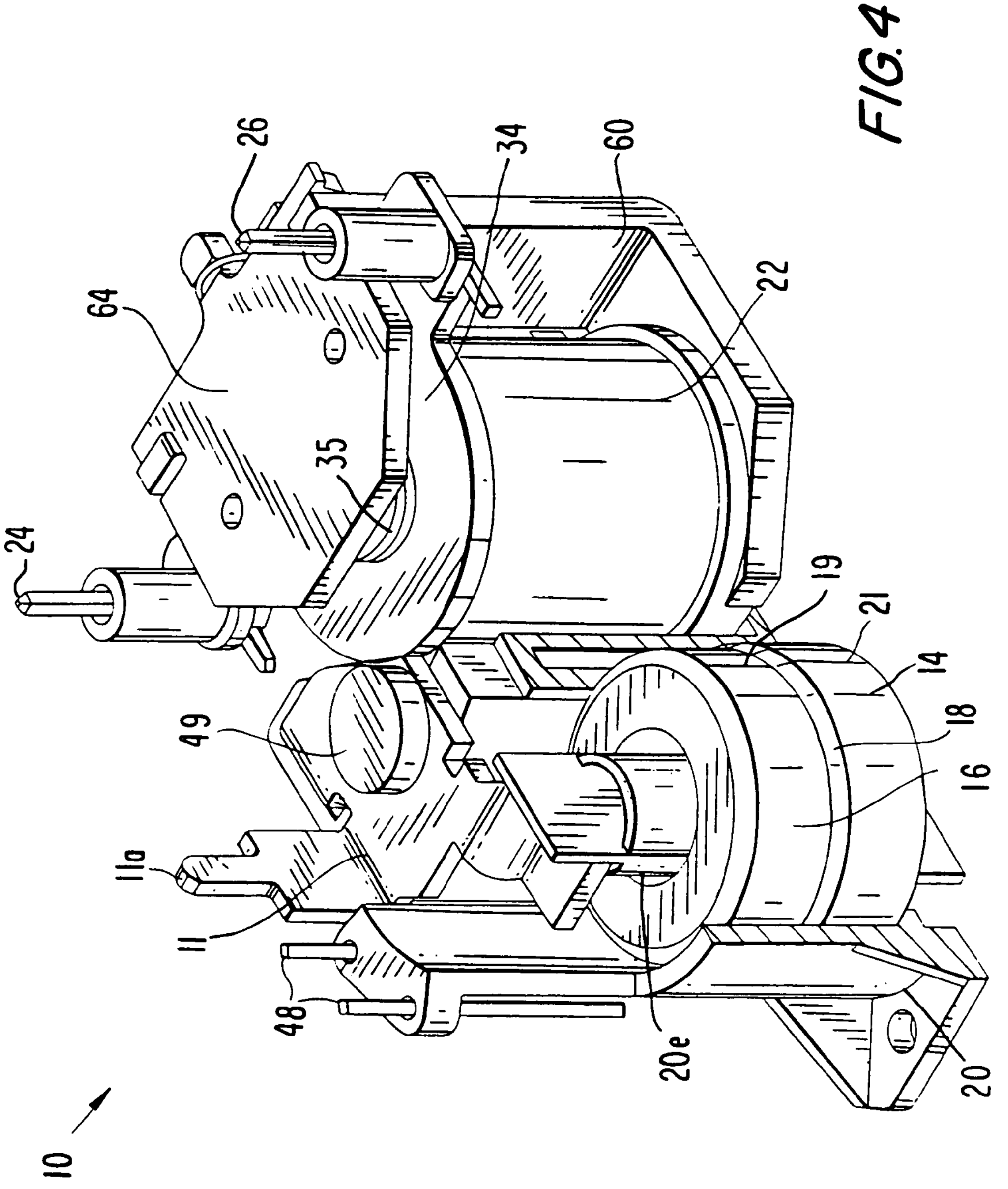
FIG. 4 is another view of FIG. 3 with some structure removed and further sectioned to the internal structure of the module.

Referring to FIG. 1, the relay portion includes a DPST relay having a pair of movable contact arms 30, 32 for supporting respective upper contacts 41, 43. The upper contact 43 is positioned over a lower stationary contact 49 (FIG. 2) to make contact with contact 49. Likewise, upper contact 41 is positioned over a lower stationary contact 47 (FIG. 3) to make contact with contact 47. The lower contact 47 is electrically connected to a top portion of a support member 13 (FIG. 3). Likewise, the lower contact 49 is electrically connected to a top portion of a support member 11 (FIG. 4). A right angle tab portion 13*b* is located on a side of the member 13 to snap into a slot 20*c* of the housing 20. In a similar manner, FIG. 2 shows a right angle tab portion 1*b* located on a side of the member 11 to snap into a slot 20*d* of the housing 20. Referring to FIG. 1, stationary contact pins 11*a*, 13*a* extend at a right angle from respective members 11, 13 to allow for connection to GFCI electrical circuitry on a PC board (not shown). Contact arms 30, 32 include respective openings 70, 72 for attachment to wires for connection to load terminals (not shown). Referring to FIG. 2, a barrier stop 52 made of insulating material such as plastic is positioned over movable contact arms 30, 32 and is snapped onto support members 11, 13. The non-conductive barrier stop 52 acts as an upward stop for the movable contact arms 30, 32. The upper contacts 41, 43 and lower contacts 47, 49 can be made of a silver composition or other metal alloy. The contact arms 30, 32 can be made of a conductive metal such as beryllium copper or other copper alloy. Support members 11, 13, can be made of brass or other metal.

The relay is adapted to selectively connect phase and neutral conductive paths between a line and load side (not shown). The line side refers to the side that is connected to a source of power such as AC power from a wall socket and the load side refers to the side that is connected to an electrical load or device. The relay is in one of two states depending on whether the upper contacts 41, 43 are in contact with the respective lower contacts 47, 49. In a closed state (not shown), contacts 41, 43 are in contact with the respective lower contacts 47, 49 and allow current to flow from the line side to the load side. On the other hand, in an open state, as shown in FIG. 1, contacts 41, 43 are not in contact with the respective lower contacts 47, 49 and current does not flow from the line side to the load side. The lower contacts 47, 49 are in electrical contact with respective upper contacts 41, 43 when the relay coil 22 is energized during normal operation such as in the absence of a ground fault condition. When the GFCI circuitry detects a ground fault condition, the relay coil is de-energized thereby breaking the connection between the lower contacts 47, 49 and the respective upper contacts 41, 43.

Referring to FIG. 4, a bobbin 34 made of plastic and wound with coil wire 22 is disposed in a relay frame 60. The coil wire 22 has two ends connected to respective coil pins 24, 26 which are mounted through respective support members extending from an upper portion of the bobbin 34. The coil pins 24, 26 are adapted to be connected to a PCB (not shown). A core 35 (e.g., metal headed rod) passes through a center portion of the bobbin 34 and coil wire 22 assembly. The bottom end of core 35 is "peened" over (shaped) to hold the coil bobbin 34 to a relay frame 60 made of metal. The relay frame 60 is a metal jacket having walls that surround and hold the relay core assembly (bobbin 34, coil 22, and core 35). An armature plate 64 of metal is disposed over the relay core and hinges on a wall of the relay frame 60. The plate 64 is magnetically drawn to the relay core 35 when the coil 22 is energized.

Referring to FIG. 2, an insulation layer 56 separates the armature plate 64 and the contact arms 30, 32. The insulation layer 56 also includes a rib located between the two contact arms 30, 32. A clamp 28 is positioned over the contact arms 30, 32. A pair of insulated eyelets or rivets 36, 38 extend through the clamp 28, contact arms 30, 32, insulation layer 56 and armature plate 64 to hold these elements in place. A relay spring 54 provides a mechanical bias so as to maintain the armature plate 64 in an upward open position until the relay coil 22 is energized. One end of the relay spring 54 is connected to a rear portion of the armature plate 64 and the other end of the spring is connected to the base of the frame 60.

Referring to FIG. 4, the transformer portion includes a first transformer 16 disposed or positioned over a second transformer 14 forming a staked arrangement. Alternatively, the second transformer 14 can be positioned over the first transformer 16. The first transformer 16 includes a first core 19 and the second transformer 14 includes a second core 21. In one embodiment, cores 19, 21 can have a "doughnut" or toroidal shape with a central hole so that it can be mounted to column member 20*e* extending from the base of the housing 20. A washer 18, which can be made of insulating or non-conductive material such as fiber, is positioned between the transformers 14, 16 to physically separate one transformer from the other, however, the cores 19, 21 are magnetically coupled to each other. The first core 19 is wound with a coil of wire having ends which are electrically coupled to respective pins of a first pair of transformer pins or terminals 48. Likewise, the second core 21 is wound with a coil of wire having ends which are electrically coupled to respective pins of a second pair of transformer pins or terminals 50 (FIG. 2) which are located opposite the first terminals 48.

Referring to FIG. 2, each pair of transformer pins 48, 50 is mounted through respective right angle portions 20*a*, 20*b* extending from an upper portion of the housing 20. The housing 20 as well as transformer pins 48, 50 are adapted to be mounted and electrically connected to a PC board (see FIG. 5). In one embodiment, the second transformer 14 can be a neutral transformer and the first transformer 16 can be a differential transformer as known in GFCI applications. A neutral transformer detects a low impedance condition between a load side neutral and a ground conductor and a differential transformer detects an unbalanced current flowing through a line side phase and neutral conductor. The module 10 can be part of a GFCI such as shown in U.S. Pat. Nos. 5,568,344 and 5,963,406.

Figure 5:
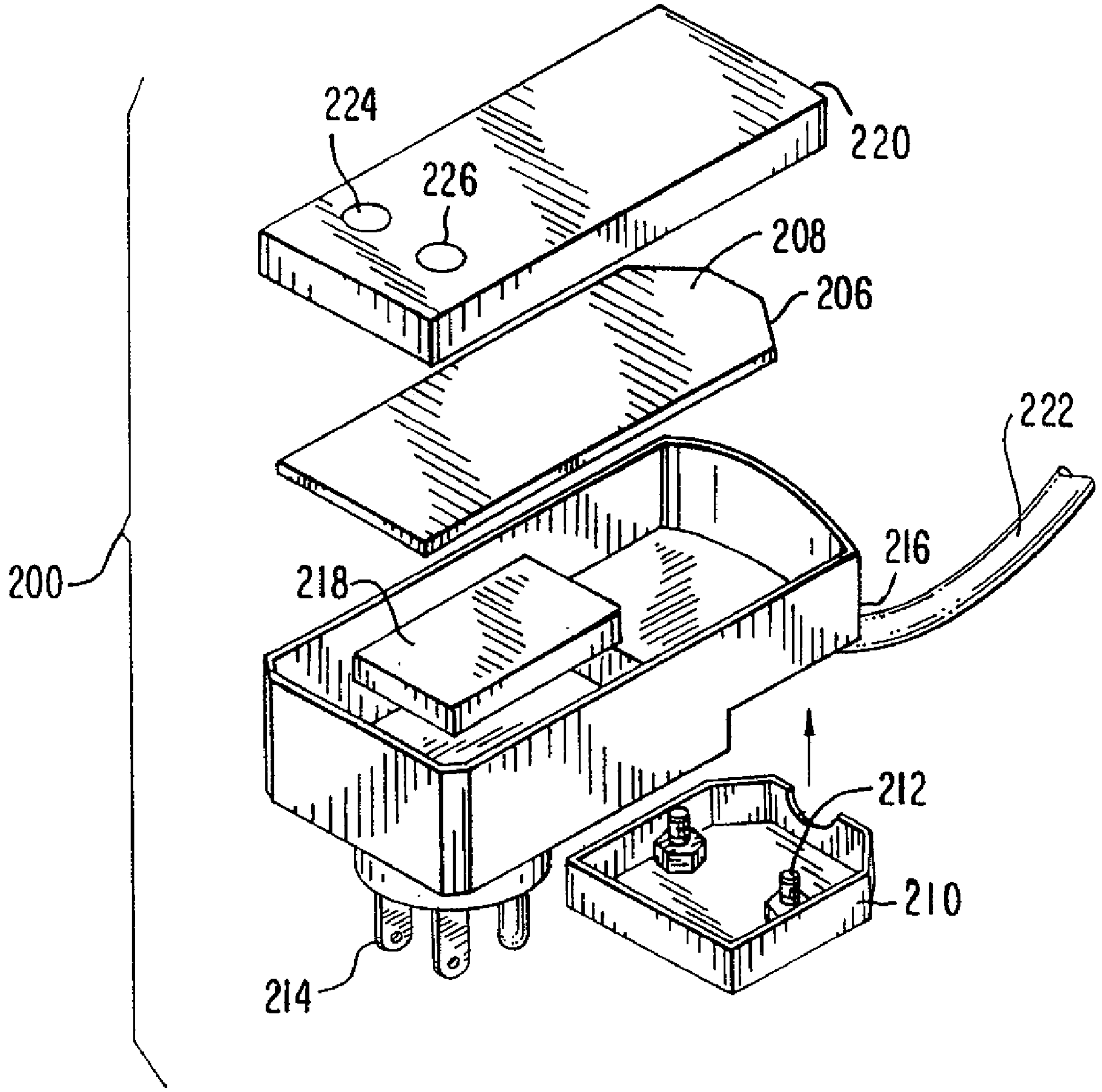
FIG. 5 is a perspective view of an embodiment of a compact module for use in an GFCI electrical plug according to the present invention.

FIG. 5 shows an angled GFCI electrical plug 200 incorporating a compact relay module 218 of the present invention. The electrical device 200 includes a front housing 220 and a rear housing 216 with an angled plug portion 214 having standard line side power blades or prongs (i.e., phase, neutral and ground) for connection to a wall socket. A standard electrical cable 222 with power conductors or wires is used for connection to an electrical load or device such as an electrical appliance (not shown). The front housing 220 includes test 224 and reset 226 buttons for activating respective test and reset functions of the GFCI. The module 218 is mechanically and electrically coupled to a PC board 206 having GFCI circuitry 208 for performing the functions of a GFCI. This assembly is inserted into a cavity of the rear housing 216 and then the housing 216 is sealed with the front housing 220 using well known fastening techniques such as screws or welding. A cover 210 is attached to the rear housing 216 using screws 212 or other fastening means. Although the above description is directed to an angled electrical plug, the disclosed techniques are equally applicable to other configurations such as in-line devices, panel-mounts, and other configurations.

While there have been shown and described and pointed out the fundamental features of the invention as applied to the preferred embodiment as is presently contemplated for carrying thereout, it will be understood that various omissions and substitutions and changes of the form and details of the device described and illustrated and in its operation may be made by those skilled in the art, without departing from the spirit of the invention.

What is claimed is:

1. A module having a relay and transformer connectable to a printed circuit board (PCB) in a ground fault circuit interrupter (GFCI), the module comprising:

a first transformer having a core and electrically coupled to a first set of terminals for connection to a printed circuit board (PCB);

a second transformer magnetically coupled to said first transformer is electrically coupled to a second set of terminal for connection to said PCB;

a double pole single throw (DPST) relay having a pair of stationary contacts, a pair of movable contacts and an electrical coil surrounding a magnetic core; and a structural support for mounting said first transformer, said second transformer, and said relay independent of the printed circuit board and in fixed relative position;

wherein a radial axis of each of said first transformer, said second transformer and said relay are substantially parallel with respect to each other, and wherein at least one cross-section of one of said first and said second transformers taken along a plane perpendicular to said radial axes of said first and second transformers is coplanar with at least one cross-section of said relay taken along a plane perpendicular to said radial axis of said relay.

2. The module of claim 1, wherein said first transformer is positioned over said second transformer forming a stacked relationship to each other.

3. The module of claim 1, wherein one of said first and second transformer is a differential transformer for detecting an unbalanced current flowing through a line side phase and neutral conductor.

4. The module of claim 1, wherein one of said first and second transformer is a neutral transformer for detecting a low impedance condition between a load side neutral and ground conductor.

5. The module of claim 1, wherein said core is a magnetic core having a toroidal shape.

6. The module of claim 1, wherein said pair of stationary contacts and said pair of movable contacts are in contact when said coil of said DPST relay is energized.

7. The module of claim 1, wherein said pair of stationary contacts are supported by respective contact arm members.

8. The module of claim 1, wherein said pair of movable contacts are supported by respective contact arm members.

9. The module of claim 1, wherein said DPST relay further comprises an armature plate that hinges on a top portion of a relay frame.

10. The module of claim 9, wherein said DPST relay further comprises a spring for providing an upward bias to said armature plate, the spring having a first end attached to a portion of said armature plate and a second end attached to said relay frame.

11. The module of claim 9, wherein said DPST relay further comprises a clamp for securing said movable contacts to said armature plate.

12. The module of claim 9, wherein said coil of said DPST relay is wound around a bobbin and said magnetic core passes through the center of the bobbin.

13. The module of claim 12, wherein said DPST relay further comprises a rod shaped metal core that passes through a central opening of said bobbin to hold said bobbin to said relay frame.

14. The module of claim 1, wherein said second transformer has a core.

15. The module of claim 14, wherein the core of said first transformer and the core of said second transformer each have a toroidal shape.

16. The module of claim 1, wherein said first transformer and said second transformer are each mounted to a column member of said structural support.

17. The module of claim 1, further comprising a non-conductive washer positioned between said first transformer and said second transformer.

18. An electrical plug comprising:

a printed circuit board (PCB) that includes a ground fault circuit interrupter (GFCI) circuit; and a compact module that includes a pair of transformers and a double pole single throw (DPST) relay;

said pair of transformers each has a core and is electrically connected to respective terminal pins of said module for connection to said PCB;

said relay has a pair of stationary contacts, a pair of movable contacts, and an electrical coil surrounding a magnetic core;

wherein a radial axis of each transformer of said pair of transformers and a radial axis of said relay are substantially parallel with respect to each other, and wherein at least one cross-section of one transformer of said pair of transformers taken along a plane perpendicular to said radial axis of said one transformer of said pair of transformers is coplanar with at least one cross-section of said relay taken along a plane perpendicular to said radial axis of said relay.

19. The plug of claim 18, wherein one of said pair of transformers is positioned over the second of said pair transformers forming a stacked relationship to each other.

20. The plug of claim 18, wherein said electrical plug is an angled electrical plug.

21. The plug of claim 18, wherein one of said pair of transformers is a differential transformer for detecting an unbalanced current flowing through a line side phase and neutral conductor.

22. The plug of claim 18, wherein one of said pair of transformers is a neutral transformer for detecting a low impedance condition between a load side neutral and ground conductor.

23. The plug of claim 18, wherein each core is a magnetic core having a toroidal shape.

24. The plug of claim 18, wherein said pair of stationary contacts and said pair of movable contacts are in contact when said relay is energized.

25. The plug of claim 18, wherein said pair of movable contacts are supported by respective contact arm members.

26. The plug of claim 18, wherein said pair of stationary contacts are supported by respective contact arm members.

27. The plug of claim 18, wherein said DPST relay further comprises an armature plate that hinges on a portion of a relay frame.

28. The plug of claim 27, wherein said DPST relay further comprises a spring for providing an upward bias to said armature plate, the spring having a first end attached to a portion of said armature plate and a second end attached to said relay frame.

29. The plug of claim 27, wherein said DPST relay further comprises a clamp for securing said movable contacts to said armature plate.

30. The plug of claim 27, wherein said DPST relay further comprises a bobbin wound with a coil of magnetic wire that is surrounded by said relay frame.

31. The plug of claim 30, wherein said DPST relay further comprises a rod shaped metal core that passes through a central opening of said bobbin to hold said bobbin to said relay frame.

32. A ground fault circuit interrupter (GFCI) having a printed circuit board (PCB) and a self-contained module, said module comprising:

a first transformer having a core and electrically coupled to a first set of terminals for connection to a printed circuit board (PCB);

a second transformer magnetically coupled to said first transformer and is electrically coupled to a second set of terminals for connection to said PCB;

a double pole single throw relay (DPST) having a pair of stationary contacts and a pair of movable contacts, and an electrical coil surrounding a magnetic core; and a structural support for mounting said first transformer, said second transformer and said relay being independent of the printed circuit board an in fixed relative position;

wherein a radial axis of each of said first transformer, said second transformer and said relay are substantially parallel with respect to each other, and wherein at least one cross-section of one of said first and said second transformers taken along a plane perpendicular to said radial axes of said first and second transformers is coplanar with at least one cross-section of said relay taken along a plane perpendicular to said radial axis of said relay.

33. The GFCI of claim 32 wherein one of said pair of transformers is positioned over the second of said pair of transformers forming a stacked relationship to each other.

34. The GFCI of claim 32 wherein one of said pair of transformers is a differential transformer for detecting an unbalanced current flowing through a line side phase and neutral conductor.

35. The plug of claim 32, wherein one of said pair of transformers is a neutral transformer for detecting a low impedance condition between a load side neutral and ground conductor.

36. The plug of claim 32, wherein each core is a magnetic core having a toroidal shape.

37. The plug of claim 32, wherein said pair of stationary contacts and said pair of movable contacts are in contact when said relay is energized.

38. The plug of claim 32, wherein said pair of movable contacts are supported by respective contact arm members.

39. The plug of claim 32, wherein said pair of stationary contacts are supported by respective contact arm members.

40. The plug of claim 32, wherein said DPST relay further comprises an armature plate that hinges on a portion of a relay frame.

41. The plug of claim 32, wherein said DPST relay further comprises a spring for providing an upward bias to said armature plate, the spring having a first end attached to a portion of said armature plate and a second end attached to said relay frame.

42. The plug of claim 32, wherein said DPST relay further comprises a clamp for securing said movable contacts to said armature plate.

43. The plug of claim 32, wherein said DPST relay further comprises a bobbin wound with a coil of magnetic wire that is surrounded by said relay frame.

44. The plug of claim 32, wherein said DPST relay further comprises a rod shaped metal core that passes through a central opening of said bobbin to hold said bobbin to said relay frame.

* * * * *